Patented Jan. 2, 1951

2,536,137

UNITED STATES PATENT OFFICE 2,536,137

FROZEN FOOD PRODUCT AND METHOD OF MAKING THE SAME

Newell H. Lundquist, Rochester, Minn., assignor to Cresthaven Farms, Minneapolis, Minn., a corporation of Minnesota No Drawing. Application June 18, 1948, Serial No. 33,930

6 Claims. (Cl. 99—136)

This invention relates to a food product such as an ice cream or frozen food product and method of making the same. It is now the common practice to make ice cream from a mixture containing quite a few ingredients, such as liquid milk, liquid cream, dried milk, usually dried skim milk, a sweetening agent and usually a very small percentage of a stabilizer. Various ingredients are used to produce a certain fat content and commercial ice cream usually has a minimum of about 12 per cent fat content.

It is an object of this invention to provide an ice cream or frozen food product, the main and only ingredient of any consequence besides the sweetening agent being butter-milk formed by churning sweet cream having a fat content of approximately 50 per cent.

It is another object of the invention to provide a process of making a food product such as an ice cream or frozen food product which consists in taking butter-milk formed by churning a sweet cream having from 40 to 60 per cent fat content, condensing said butter-milk, adding a sweetening agent and the customary very small percentage of a stabilizer, such as gelatin, and freezing said mixture in the usual manner of freezing ice cream.

It is another object of the invention to provide a process of making a food product such as an ice cream or frozen food product which consists in taking butter-milk formed by churning sweet cream having a fat content of approximately 50 per cent, condensing said butter-milk to a liquid and solid ratio of approximately 3 to 1, adding a sweetening agent and freezing said mixture.

It is still another object of the invention to provide a food product such as an ice cream or frozen food product having as the main and only ingredient of any appreciable proportion besides the sweetening agent a butter-milk formed by churning sweet cream having a fat content of approximately 50 per cent.

These and other objects and advantages of the invention will be set forth in the following description:

In carrying out the process a sweet cream is provided having a fat content of approximately 50 per cent. While the cream having a fat content of approximately 50 per cent is desirable and has been used in practice, good results could be obtained by using a cream having from 40 to 60 per cent fat content. This cream is churned in the usual manner and the butter-milk formed in said churning is then taken and condensed. One convenient way of condensing the butter-milk is in vacuum pans and the butter-milk is condensed to a liquid and solid ratio of approximately 3 to 1. This condensed butter-milk then has sugar or other sweetening agent added thereto and preferably a small percentage of a stabilizer is used, such as one-half of 1 per cent of gelatin. The mixture is then frozen while being stirred or being in motion in the usual method of freezing ice cream.

From the above method a food product such as an ice cream or frozen food product is produced having unusual richness in taste and texture. The fat content of the product is only about 7 per cent. The product however has a much richer taste and texture than a regular ice cream having a much higher fat content. Some experimental work has been done in connection with the process and some theories have been advanced as to why the ice cream has such a rich taste and texture but nothing definite has been as yet determined.

The said product is also believed to be much higher in vitamin content and in riboflavin than ordinary commercial ice creams. Flavoring will of course be used as desired.

From the above description it will be seen that I have provided a novel and highly useful method and product. By using a cream having approximately 50 per cent butter fat the same can be churned and the butter will be used in the normal manner. The resulting butter-milk thus becomes a substance having immense possibilities as a food product. The product is of such rich flavor and good texture that it has been declared highly superior by all who have had an opportunity to use it. The product is particularly pure as it does not have to be doctored with a number of ingredients. All of the fat content in the product is contained in the butter-milk and no ingredient such as butter, etc., has to be added to increase the fat content. The product can be produced at less cost than the ordinary commercial ice cream. The mixture reaches maximum overrun when being frozen much quicker than ordinary mixtures. The butter-milk increases the whipping qualities of the mix. The method and product have been amply demonstrated in actual practice and found to be highly successful.

It will of course be understood that various changes may be made in the form, details, arrangement and proportions of the product and in the steps and sequence of steps of the method without departing from the scope of applicant's invention, which generally stated, consists in a method and product capable of carrying out the objects above set forth, such as disclosed and defined in the appended claims.

What is claimed is:

1. The process of making a frozen food product which consists in providing sweet cream having a fat content of approximately 50 per cent, churning said cream, taking the butter-milk resulting from said churning, condensing the same, adding a sweetening agent and freezing said mixture while being stirred whereby said butter-milk is the main and principal ingredient of said product.

2. The process of making a frozen food product which consists in taking butter-milk formed from churning sweet cream having a fat content of from 40 to 60 per cent, condensing said butter-milk to approximately a three to one liquid and solid ratio, adding a sweetening agent and freezing said mixture while in motion whereby a product of great richness in taste is produced, the same having a fat content of approximately 7 per cent.

3. The process of making a frozen food product which consists in using as the main ingredient thereof a condensed liquid butter-milk formed from churning sweet cream of approximately 50 per cent fat content.

4. A frozen food product frozen from a mix containing as the major and principal milk solid ingredient condensed liquid butter-milk formed by churning sweet cream having a fat content of from 40 to 60 per cent.

5. The method of making a frozen food product which consists in churning a sweet cream having a fat content of over 40 per cent, taking the buttermilk produced in said churning and condensing the same, preparing a mix to be frozen and using said condensed buttermilk as the major ingredient of said mix and then freezing said mix while being stirred.

6. The process of making a frozen food product which consists in taking buttermilk formed from churning sweet cream having a fat content of between 40 and 60 per cent, condensing said buttermilk to approximately three to one liquid and solid ratio, adding a comparatively small amount of a sweetening agent and freezing said mixture while in motion whereby a product of great richness in taste is produced, the same having a low fat content.

NEWELL H. LUNDQUIST.

REFERENCES CITED

The following references are of record in the file of this patent:

UNITED STATES PATENTS

| Number | Name | Date |
| --- | --- | --- |
| 2,071,367 | Weisberg et al. | Feb. 23, 1937 |
| 2,128,845 | Myers et al. | Aug. 30, 1938 |
| 2,433,276 | Hipple et al. | Dec. 23, 1947 |

OTHER REFERENCES

The Ice Cream Trade Journal, vol. 36, No. 9, page 45, Sept. 1940.